United States Patent [19]

Koschlig et al.

[11] Patent Number: 5,346,119
[45] Date of Patent: Sep. 13, 1994

[54] WORK PIECES HAVING A WEAR RESISTANT COATING PRODUCED BY BRAZING AND PROCESS FOR PRODUCING SAME

[75] Inventors: Manfred Koschlig, Aschaffenburg; Harald Krappitz, Hanau-Grossauheim, both of Fed. Rep. of Germany

[73] Assignee: Degussa Aktiengesellschaft, Fed. Rep. of Germany

[21] Appl. No.: 41,426

[22] Filed: Mar. 31, 1993

[30] Foreign Application Priority Data

Apr. 3, 1992 [DE] Fed. Rep. of Germany ... 9204579[U]
Nov. 10, 1992 [DE] Fed. Rep. of Germany ....... 4237890

[51] Int. Cl.⁵ .................. B24D 3/00; B23K 31/02
[52] U.S. Cl. .................. 228/248.1; 228/56.3; 427/199; 427/201; 51/295
[58] Field of Search ............ 228/122, 212, 248, 56.3; 51/293, 295; 427/199, 201, 205, 287

[56] References Cited

U.S. PATENT DOCUMENTS

| | | | |
|---|---|---|---|
| 4,866,885 | 9/1989 | Dodsworth | 51/295 |
| 4,916,869 | 4/1990 | Oliver | 51/295 |
| 5,213,590 | 5/1993 | Neff | 51/295 |

OTHER PUBLICATIONS

Production and Characteristics of Wear-Resistant Coatings, Using Plastic-Bonded Carbide and Brazing Preforms, H. Krappitz et al, Degussa.

*Primary Examiner*—Samuel M. Heinrich
*Attorney, Agent, or Firm*—Beveridge, DeGrandi, Weilacher & Young

[57] ABSTRACT

Parts subject to wear having coatings made of hard substances formed by subdividing the protective layer into segmented joint faces and wherein the joint faces interlace to form seams that are as close as possible to each other.

6 Claims, 2 Drawing Sheets

WORK PIECES HAVING A WEAR RESISTANT COATING PRODUCED BY BRAZING AND PROCESS FOR PRODUCING SAME

INTRODUCTION AND BACKGROUND

The present invention relates to shaped work pieces and parts that are subjected to wear in actual use and that are designed with a wear resistant coating made of a hard substance. In particular, the invention relates to providing improved work parts which are used in an environment where they are subjected to wear and abrasion because the work part performs as a sealing surface that slides along a countersurface, or surface with which the part comes into contact. A hard substance protective coating that is wear resistant is formed on the surface of the work part by a brazing technique.

In a further aspect the invention also relates to the process of producing the wear resistant coatings on the work piece.

Designing parts that are subject to wear with protective coatings made of hard substances is a generally known technology and various procedures are known in the art for applying the hard coatings.

Year after year considerable economic losses are caused by the effects of various forms of wear on technical structures. Economic and technical considerations as well as increased awareness of the limited availability of valuable raw materials are the factors underlying the rising importance of wear protection technology in recent years. This development has been spurred on by mounting demands regarding the reliability of functional surfaces under often extreme stresses of thermal, electrochemical and mechanical nature. Efforts to improve performance data and efficiency in the machine industry, plant construction and automobile manufacturing sectors, for example, have led to the imposition of more stringent demands on the materials being used. This, in turn, has brought about the functional separation of tribologically stressed surfaces and the auxiliary components of a work piece which are, in most cases, exposed to far less stress. Surfaces can therefore be ideally matched to the stresses they will encounter in actual use. This functional separation is achieved by the deposition of suitable protective surface layers, this definition covering the whole of the extensive field of coating technology.

At present, there are a large number of procedures available for the deposition of such coatings. The scope extends from chemical and electrochemical procedures to those for the deposition of ultra-thin layers by vapor phase from thermal spraying procedures to those for plating and surfacing, by which layers in the millimeter range up to several centimeters in thickness can be obtained.

The choice of procedure for a particular application is determined from a technical point of view by the load cycle acting on the composite material, and its required specification. Further factors which are decisive in the selection of one procedure or another are the economic aspects of the decision, as well as investment considerations on the basis of component requirements.

If work pieces are subjected to extreme wear, yet at the same time must exhibit a high degree of dimensional stability, a satisfactory solution can often be found by using cemented carbides. An example of its use in the automobile construction sector are parts of the valve gear. Further applications include cutting edges for a wide variety of metal cutting tools.

Brazing has become by far the most important method of joining cemented carbides to supporting bases. Because of their predominantly carbide structure, cemented carbides, are only suitable for brazing under certain conditions. This disadvantage was compensated for by the development of carbide brazing alloys containing alloy components which promote wetting. The alloys used are silver- or copper-based, with zinc, nickel and/or manganese additives.

In addition to the various sorts of cemented carbides, highly abrasive materials and cutting materials such as ceramics, composite diamond materials or polycrystalline diamond (PKD) are also used for machining purposes. With these relatively new cutting materials, even hard stone can be cut very successfully. They are not only used in drilling wells, but also for quarrying and additional cutting of stone blocks. Here too, brazing is the dominant joining process for the deposition of hard material coatings.

Further methods of depositing wear-resistant layers involve brazing tungsten carbide of various particle sizes to a substrate. This enables not only tools for processing extremely hard and brittle materials (e.g. glass drills) to be manufactured, but also abrasive tools of the rubber industry.

Brazing alloys can be used not only to form wear-protecting bonds between the coating and substrate, but also possess outstanding wear-protecting characteristics of their own. Nickel-based brazing alloys for example have been derived from nickel hardfacing alloys of the NICrBSi system.

Flexible materials in the form of strips, mats or bands made of plastics that contain hard substances and a solder powder mix have been used for quite sometime to coat metallic bases with coatings made of a hard wear resistent substance. The production and design of these materials is described, for example, in DE-PS 38 01 958. These materials are also used for coating large surfaces (larger than $60 \times 60$ mm$^2$) with thicknesses of between 0.5 to 6 mm. Typically in the industry the thickness of the flexible bands is 1 to 3 mm. The proportion of hard substance or brazing powder in the plastic materials is somewhere between 30 to 80 percent of volume. These flexible bands are so pliable that they can be laid up onto the surface of the work piece to be brazed so that it forms a skin. After heat treatment the layer is securely thermally bonded to the underlying work piece. One characteristic of all these materials is that this plastic binder burns out, volatilizing almost completely at temperatures of between 200° C. to 600° C., depending upon the plastic used. Such thermoplastic binders are well known in the art. A mound of braze metal remains that displays a mechanical interlocking with the hard substance, depending upon the percentage of hard substance and type of production. The result is a bonded coating between the work piece or working surface and the protective layer.

Once heated to temperatures above the liquidus temperature of the brazing powder mix, there results a stable compound. As a result, one obtains a protective coating formed of the brazing layer that contains the hard substance in finely distributed form.

In the coating of metallic bases with thermally volatilizable plastic materials that contain more than 40% in volume of hard substance and brazing powder, there appears relative motion between the protective coating layer and the underlying metallic body during heating at processing temperatures above 950° C. The coating, which is usually designed for relatively large surfaces, is placed under such tensile stress that the coating, in its entirety, cannot withstand it. The consequence of these relative movements is uncontrolled crack formations with crack widths of up to 2 mm depending on the geometry of the coated surface. Cracks with a width of more than 0.5 mm are not completely filled by the solder alloy because of the lack of capillary filling pressure. Along with the crack effect that results because of geometric reasons, locally distinct differences appear in the mechanical characteristics that are caused in the cracks by the lack of hard substance in the compound or the coating and this produces errors that are not acceptable for parts that must have close tolerances on fit.

SUMMARY OF THE INVENTION

An object of the invention is to create protective coatings for parts subject to wear, and in particular for those parts subject to wear that function as a sealing surface that slide along a countersurface. The sealing surface is provided with a coating made of a hard substance with no zones on the surface that are devoid of the hard substance coating.

In accordance with the invention, a feature resides in a hard substance coating formed from a brazing layer containing a finely divided hard substance uniformly distributed. The coating layer is formed from a flexible band of plastic containing finely divided hard substances and a brazing powder mix. The plastic band is then subdivided into segments, such as squares, each segment generally having a plurality of joint faces, whereby the joint faces are lined up to form jointed seams that are as close as possible to each other.

Advantageously, the sides of the individual joint face of the segments are sloped at an angle of 30° to 60° with respect to the surface against which it is positioned; i.e., the parallel-running sides of neighboring joint face segments. This arrangement forms as narrow a seam as possible between the surfaces of segments in contact with each other. The seams are connected to each other without interruption across the surface of the material base that is intended to be protected.

Preferably, the joint face segments have a square shape or substantially square shape and have an edge length of about 20 to 60 mm.

Another feature of the invention is to provide a process of forming protective surfaces on work pieces by laying up a layer of hard particulate material embedded in a brazing alloy. Generally, two layers are used, a flexible plastic band or mat containing the particulate inorganic hard material metal such as carbide and a top layer of brazing alloy in a plastic binder. Heating to elevated temperatures e.g., 950° C., volatilizes the plastic binder, melts the brazing alloy and securely bonds the carbide or other hard material to the work piece.

The layers are cut into segments and the segments are shaped to have sloping sides to mate with each other and to compensate for differences in coefficients of thermal expansion among the materials and base.

BRIEF DESCRIPTION OF THE DRAWINGS

The present invention will be further understood with reference to the drawings herein.

DETAILED DESCRIPTION OF THE INVENTION

The goal of the present invention is, inter alia, to increase the abrasion and wear resistance of work pieces and parts subjected to wear. The protection against wear and abrasion is only obtained when the protective coating can be formed on the surface of the part to be protected without any ruptures or cracks. When using hard material containing surface layers, segmenting of the protective surface in accordance with the invention must be used because during the heating which is needed to form the protective coating on the work part differences in thermal expansion coefficients between the coating and the work piece must be compensated for.

The term "sealing surface" as used herein can refer to work surfaces that slide one upon the other such as is the case frequently in pumps or in situations where abrasive materials are conveyed in apparatus involving surfaces which move relative to each other. Normally, both surfaces are machined or manufactured so that no foreign bodies can come between them. Such foreign bodies would substantially increase the wear and abrasion between surfaces which move relative to each other. However, in the commercial world it is frequently the situation that through some elastic deformation of the work surfaces in operation, foreign bodies do indeed position themselves in between moving surfaces and parts. Originally such surfaces would have been designed so as to be sealed to prevent such intrusion by foreign particles, but in the course of moving of such parts, these problems arise. Examples of this problem occur in connection with pumps and pistons in motors.

In the case of two surfaces which slide against each other, the term "counter surface" can be used. With work pieces that are subjected to abrasion it is conceivable that parts made of the same metal as well as different metals would be in contact and sliding against each other. It is a question in the particular technology as to which surface of a pair of sliding surfaces should be designated as the "counter surface." So, for example, in a mixer apparatus, a coated impeller blade can slide past the interior surface of the vessel or reactor or it can scratch that surface. A manufacturer of the impeller blade would refer to the interior surface of a chemical reaction vessel as the "counter surface." In contrast, the manufacturer of the chemical reaction vessel might refer to the coated impeller blade agitator as the "counter surface." In the case of the "sealing surface" this means two surfaces which pass against each other where one of such surfaces is always referred to as the counter surface.

Figure 1A:
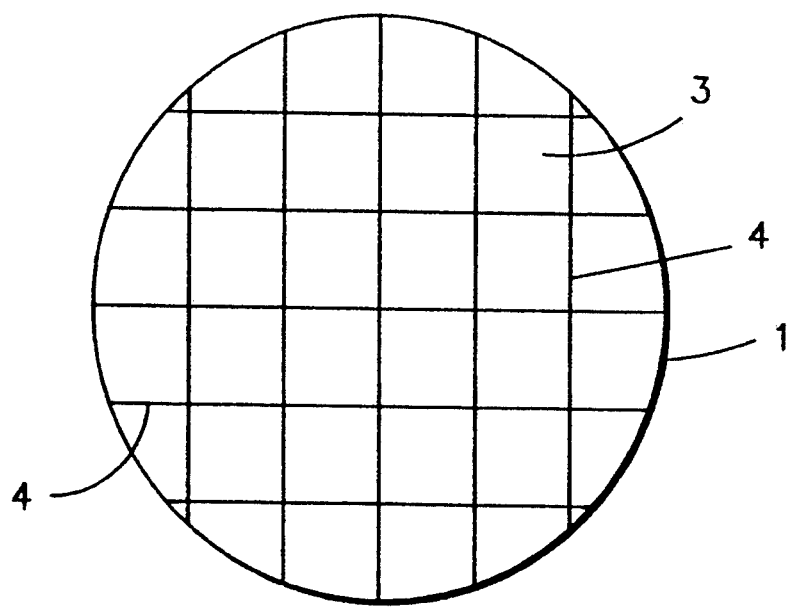
FIG. 1A is a top plane view showing the segmented section of the protective coating of the invention.

FIG. 1A shows a composite article according to the invention, i.e., base structure support or substrate (1) made of steel, which has a layer of joint face segments (3) made of plastic containing brazing powder mix. The seams (4) formed by the cut segments (3) are connected to each other in a straight line in both directions. This is before exposure to high temperature.

Figure 1B:
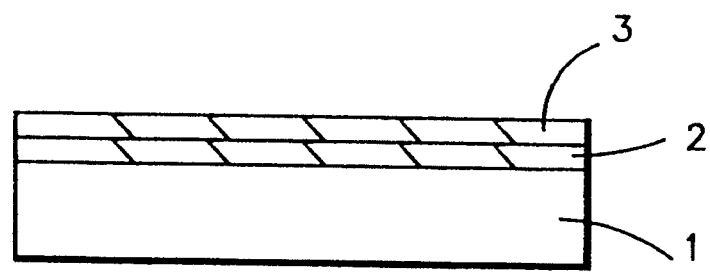
FIG. 1B is a side elevation view of the embodiment shown in FIG. 1.

FIG. 1B is a cross-sectional view showing the metal base (1) and two layers (2,3). The upper joint face segment (3) contains a brazing powder mix embedded in a plastic binder. The lower joint face segment layer (2) contains the plastic and the hard substances such as carbides. The side walls of the square-shaped joint face segments (2, 3) are preferably sloped at an angle of 45°. The joint face segments (2, 3) are joined in such a way that the seams (4) are as close to each other as possible. Of course, the segments (2, 3) at the edge of the basic structure (1) are adapted to its shape and size and hence the segments at the periphery of the article to be protected can be of irregular shape.

Figure 2A:
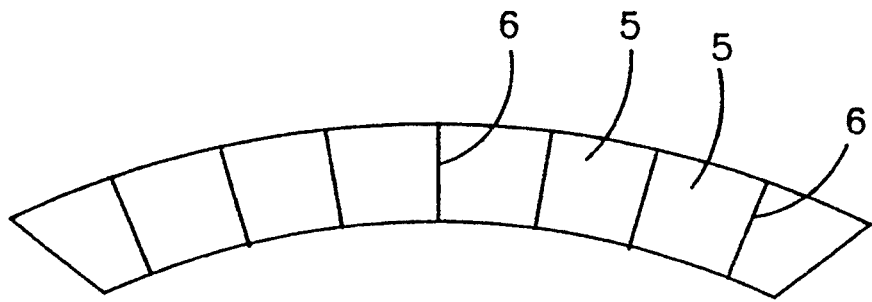
FIG. 2A is a top view of a band of segments prepared according to the invention.

FIG. 2A shows a special configuration for a knife segment for cutting cylinders in which the plastic segments (5), which contain both hard substance as well as a brazing powder mix, are positioned in such a way that the seams (6) are designed perpendicular to the particular direction of wear stress. This is configured in this way because a segment design is required only along the particular direction. In case the joint face segments are also subdivided parallel to the particular direction and a seam would appear perpendicular to the seam (6), then these seams have to be positioned at an angle of 30° to 60° with respect to this particular direction.

Figure 2B:
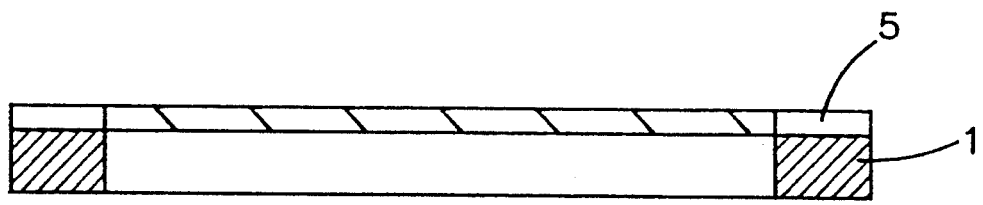
FIG. 2B is a cross-sectional side view showing the band of FIG. 2A positioned on top of an arcuate shaped work piece.
Figure 3:
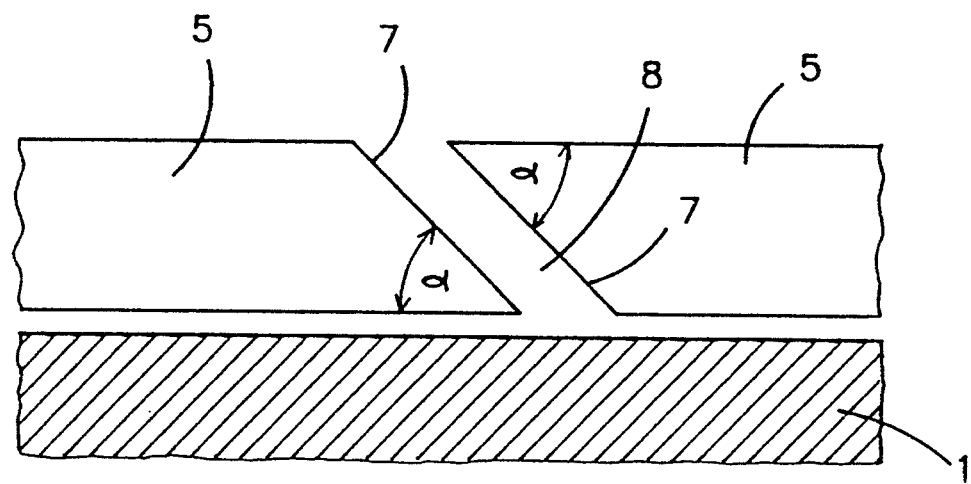
FIG. 3 is an enlarged cross section of a portion of the segments prepared according to the invention.

FIG. 2B is an elevational view showing the layer of FIG. 2A on top of the arcuate or cylindrical base (1). The contact point of two joint face segments (5) is enlarged in FIG. 3. The side walls (7) of the segments (5) are sloped at the angle, $\alpha$, against the adjacent segment surface and are positioned parallel to each other so that as close a seam (8) as possible is formed.

The coating of the parts subject to wear is carried out by applying across the entire surface thereof the flexible materials made of plastic in which are embedded the particles of hard substance and brazing powder mix, and then heating to a temperature above the liquidus temperature of the embedded brazing powder mix. During the operation, the flexible plastic materials are divided into rectilinear or square joint face segments, the edge length of which is between 20 and 60 mm. The expansion of the coated surfaces is more than 60 mm in at least one direction.

Preferably, the sides of the individual joint face segments are sloped at an angle of 30° to 60° with respect to the surface that is positioned against the parallel-running sides of neighboring joint face segments while forming as narrow a seam as possible between the surfaces in contact with each other. The seams are connected to each other without interruption across the entire portion of the work part that is subject to wear.

In some situations work pieces are subject to wear in a particular direction; for that type of wear stress, it is advantageous to position the seams of the joint faces perpendicular to the particular direction of wear stress. Generally, in those situations it is desirable to position the seams of the joint faces at an angle of 30° to 60° to the particular direction of stress.

The formation of joint face segments onto the parts subject to wear leads to crack-free coatings because the low degree of inherent stability of the solder powder-like coating can just withstand the tensile stresses resulting from relative motions during the heating phase, provided the segments have been selected small enough. A segment size of, for example, $50 \times 50$ mm$^2$ has been successful. The differences in the lengthwise expansion can be distributed to numerous seams whereby the individual absolute amount is considerably less. As a result, usually only seam expansions of up to a maximum of 0.2 mm have been observed, which fill well with the mixture because of the higher capillary pressure. The preferred basic square shape of the segments represents an especially important aspect for coatings of larger surfaces.

The interlacing seams allow for shifts in a two-dimensional direction in keeping with the development of the protective metallic structure on the work piece during the heating phase. As a result, shifting of the segments against each other is made possible.

Filling the seams or gaps between the individual segments is determined by capillary embedding pressure. The narrower the width of the gap, the better the degree of filling. Should the segments shift or the gaps open up because of the relative motion between the metallic base material and the coating, then the resulting seam width can be reduced by, e.g., up to 30% by a butt joint, provided the segment sides are sloped at an angle of, e.g., 45° with respect to the segment surfaces. It is simultaneously assured that the metallic base structure is always covered by at least a partial coating made of the hard substance.

In particular, this increases the lifespan of the entire coating should there be stresses that act perpendicular to the coating.

Seams that are positioned parallel to the main direction of stress are subject to higher wear in components that operate against each other.

Nickel-based filler metals are nickel- or nickel-chrome-based alloys, to which metalloids such as boron and silicon are added to form alloys with a lower melting temperature range and enhanced wetting behavior. These metalloids together with the other alloy elements such Ni$_3$B, Ni$_3$Si, and CrB form hard phases suitable for use as the brazing material. Due to their high hardness and brittleness, nickel-based brazing alloys are largely processed as powders. Any suitable brazing alloy, which are well known substances, can be used for purposes of this invention.

Carbide and other inorganic highly wear resistant and extremely hard substances are well known in the art and many of them can be used for purposes of this invention.

By brazing carbide powders such as WC or Cr$_3$C$_2$ or other hard substances on to a surface using nickel-based brazing alloys, it is possible to produce carbide/brazing alloy composite layers that are highly wear-resistant. These materials are used with the plastics to form the bands, mats or strips of the brazing coating layer. These are plastic-bonded brazing powder and carbide hard substance powders which can be rolled out into strips. Shaped pieces can be easily cut out of these brazing mats and carbide mats which, when laid upon substrates in pairs, form a composite layer which adheres well to the base material during brazing work.

The brazing mixture alloys used are available hard alloys, but the proportion of hard substance that results in a high degree of resistance to wear is sometimes lacking in the gap areas. This results from a "wash outs" along the seams. Seams that are preferably positioned at a diagonal to the direction of stress show a low degree of wear because the gap between segments filled with hard substance provides greater support. The design with square-shaped segments is turned in such cases in such a way that all seams are set at an angle of 30° to 60°, preferably 45°, with respect to the main direction of stress. In the event of a circular direction of stress, the seams are positioned radially, in contrast to the square-shaped grid, to adapt to the direction of stress, whereby the segment size is also supposed to remain limited to 20 to 60 mm in the radial direction. The expression "substantially square" as used herein to describe the segments is intended to cover these radially positioned segments as well. In case the parts are narrower than 60 mm, the seams are advantageously positioned perpendicular to the direction of stress in order to obviate the necessity for a segment design in this direction.

As long as the plastic layer is not heated, it remains as flexible material. The flexibility stems out of the fact that in preparing the same a synthetic plastic material is used as a binder for the powdery metallic particles. First through the heating and followed then by the softening of the plastic materials these properties are lost. The final protective coating layer which is obtained through the heat treatment and which is securely bonded to the underlying work surface no longer retains any flexibility.

Suitable thermoplastic plastic materials include polytetrafluoro-ethylene, ethylene-proplyene rubber, butyl rubber, ethylene vinyl acetate polymers and the like which are volatilizable at the heating temperature used for brazing.

In general, processing temperatures are above 950° C. Usually, temperatures are in the range of 950° to 1100° C. although occasionally temperatures of 1100° to 1250° C. are encountered. The problems resulting from the heating of the material from room temperature to the processing temperatures of higher than 950° C. arises as a result in the difference in thermal coefficients of expansion of the coating layer and the underlying material which is usually steel. This leads to a relative movement between both surfaces. As a result, cracks or tears in the coating layers can occur. After the heating treatment, the coated parts cannot be heated to more than 950° higher.

The coatings of the invention can be used on parts that are moving as well as for stationary parts. As a result they can withstand being located in abrasive media where they are subjected to streams of such materials which impact on their surfaces. They can also be used in those situations where there are two surfaces in contact with each other.

The coatings of the present invention are not adhered in the sense of using a glue or adhesive material nor are they soft solder. The term "brazing" is a term which is understood in the art and that is the process by which the coatings of the present invention are formed on the surfaces subjected to wear and abrasion.

The underlying surface on which the protective coatings are brazed is metallic. Typically the underlying metal surface is steel because of the high processing temperatures usually encountered. Other metallic surfaces could likewise be used depending upon the use and applications and the specific situations involved.

The formation of the segments and the segmentation of the coating is obtained through the cutting of the flexible bands. It is also possible to form these segmented forms by stamping the segments out from a large mat of the material. These segments are then placed together and during the processing form a closed coating on the surface of the underlying metallic work piece.

For the coating operation it is necessary to use two mats or bands; one band is formed of a hard material and plastic material mix and the other mat or band is formed from the brazing alloy particles—plastic material mixture. The latter is applied to the top of the hard particle mat and in this configuration the coating layer is built up through the heat treatment.

The invention leads to the formation and utilization of segmented surfaces which may be of a range in size of 50 by 50 mm where the thickness of these segments lies typically between 1 and 3 mm. The segmented surfaces can also be larger and not necessarily square in shape. Therefore, it is also possible to form a mat or protective layer coating sheet of a surface for example 250 mm by 10 mm. Without segments formation, one would tend to obtain cracks and tears in the protective coating through the heat treatment operation.

The segments are so exactly cut that they mate with each other without any significant spaces. In the course of the heat treatment the resulting openings in the spaces between the segments do not present any problems because the width of such space is kept so small that the melted brazing alloy fills up the space through capillary action.

The following examples, with the aid of FIGS. 1A, 1B, 6A, and 2B are presented to further explain the procedure of the invention:

1) A baffleplate (1) made of structural steel with an external diameter of 300 mm and a thickness of 30 mm is coated with segments (2) made of a plastic band containing $Cr_3C_2$ brazing powder (FIG. 1). The square-shaped segments have an edge length of 50 mm.

The sides of the segments (2) are cut to fit against each other at an angle of 45° (see FIG. 1B). The angle of the seams essentially always opens up to the same side during coating. The external contours are achieved by a simple cutting operation, whereby the external segments (2) are reduced to correspond to the external contours.

The seams (4) interlace with each other at the intersections, forming a chessboard-type design. A similar procedure is used for the segments (3) of the plastic-base brazing powder mix application. They can share the same seam structure or be displaced on top of the hard substance segments (2). The segments (3) also have an edge length of 50 mm. After coating the segments (2, 3), the component is heated to a temperature higher than the melting point of the brazing powder mix, and the liquified mixture bonds the carbide materials to each other as well as to the metallic base structure whereas the plastic escapes almost completely.

2) A knife segment for a cutting cylinder (FIG. 2) is coated with segments (5) having a thickness of 2 mm. The coating is made of plastic material containing a WC-powder and brazing powder mix. The segments (5) have cutting edges that are perpendicular to the circumferential direction, whereas the segment edges are designed at an angle of 45° to each other. The seams (6) are positioned in their extension at a diagonal to the main direction of stress in the center of the circle describing the external contours.

The production of carbide material mats is based on finely divided particles of conventional carbides such as WC or $Cr_3C_2$. This class of carbide powders well known in the art and are mixed intensively with highly viscous organic resin bonding agents; the resulting carbide/bonding agent mix is then processed into strips of varying thickness using conventional shaping methods such as compacting and rolling. A mat thickness of between 0.5 mm and 3 mm has proved to be most effective for brazing. The thickness of the carbide mat determines that of the composite layers of carbide/brazing alloy produced from it.

The finished mat can be produced in various widths and lengths depending on the intended application. It has a rubber-elastic consistency and is manufactured as an easy-to-handle material with a sufficient strength, enabling it to be processed without problem.

The demand for good brazing ability when thinly applied was met by reducing the proportion of bonding agent to approximately 2% by weight.

As with carbide material mats, the equivalent mats are produced from nickel-based brazing fluxes.

Mats of any other filler metal or metal powder can be produced by the same procedure.

Since brazing alloy and carbide mats must always be matched to each other for processing purposes, a composite carbide/brazing alloy mat consisting of both components was developed in a further production stage, thus simplifying the use of this coating technique.

The following is a more detailed description of the individual working steps in the deposition of a wear-resistant coating and the metallurgical processes which take place simultaneously.

Oxides and adhering dirt should be removed carefully from the brazing surface of the substrate to be protectively coated (e.g. plain steel). After this, an appropriately sized piece of the carbide mat is placed upon the surface to be coated. The preforms required for this purpose can be easily obtained from the mats. The required shape can be cut out using a plain knife, or produced using a punching die if required in bulk.

The carbide preform is placed together with a similarly sized filler metal preform of adapted thickness on to the substrate. It can also be fixed down and brazed in a vertical position using temporary adhesives specially developed for this purpose. A work piece prepared in this matter is then placed in a furnace, and heated in either protective gas or a vacuum.

Hydrogen or argon are suitable as protective gases. If brazing in a vacuum, the pressure should be kept below $1 \times 10^{-3}$ bar. Brazing conditions are known in the art.

At a temperature of between 500° and 600° C., the bonding agent escapes from both the carbide and brazing mats. As a result, the carbide mat takes on a defined porosity, this has a capillary effect on the brazing alloy, which melts later. At a temperature of approximately 1100° C., the molten brazing alloy infiltrates the porous carbide body and brazes it to the work piece.

The bond between the coating and substrate is characterized by a narrow region in which the brazing alloy and base material have formed an alloy. The end product is a highly bonded layer, comparable with that obtained using high-temperature brazing.

The brazing alloy solidifies to leave a thick carbide/filler metal composite layer which contains a large percentage of evenly distributed carbide, for example, up to 70% by volume.

Knowledge of the average linear-thermal coefficient of expansion is of particular relevance for the possible size of the surfaces to be coated. When coating with WC mat, thermal stresses are produced as the compound cools down, as is the case when cemented carbides are brazed on to a supporting base. These thermal stresses can be of quite considerable extent depending on the size and geometry of the coating surface, and can cause the work pieces to become warped or even lead to the formation of cracks in the coating. The thermal expansion behavior of $Cr_3C_2$ mat is, however, ideally suited to faradaic steels, since far smaller stresses are to be expected with this combination of materials.

The procedures for surfacing with filler metal and carbide mats introduced here offer a new scope for the deposition of accurately contoured coatings to work pieces.

The protective layer and bonded coatings of the invention can be used for many uses; as for example, inner coatings for various structures, cladding for mixing devices which rub or come into contact with other surfaces, knives, scissors, interior walls of tubular or cylindrical chemical reaction vessels, sliding rails/channels, and the like. In such installations, frequently two surfaces will come into contact with each other. Or, the surfaces are subject to the rubbing of an abrasive substance. Surfaces that perform cutting operations in industry would be a typical example where a material such as paper, sheets, wire or sand is sliced or cut.

Further variations and modifications will be apparent to those skilled in the art from a consideration of the foregoing and are intended to be encompassed by the claims appended hereto.

German Applications G 92 04 579.0 and P 42 37 890.7 are relied on and incorporated herein by reference.

We claim:

1. A process of providing an abrasive and wear resistant surface coating to a part that is subject to wear comprising applying to the surface of said part to be protected a flexible material made of plastic having a finely divided hard substance and a brazing alloy powder mixture embedded in the plastic, heating said material to a temperature exceeding the liquidation point of the embedded brazing powder mixture, to volatilize said plastic and deposit said hard substance and brazing alloy on said surface, wherein said flexible material is divided into substantially square shaped joint face segments, the edge length of which is between 20 and 60 mm.

2. The process in accordance with claim 1, wherein the sides of the individual joint face segments are sloped at an angle of 30° to 60°, and the adjacent sides of the adjacent joint face segments are positioned parallel to each other during said heating while forming a seam and orienting said segments so that the seams are connected to each other without interruption across the entire surface to be protected.

3. The process in accordance with claim 1 further comprising positioning the seams of the joint face segments perpendicular to the direction of stress applied from the contact of an abrasive material to the surface that is subject to wear and setting the seams of the joint face sides at an angle of 30° to 60° to the direction of the contacting abrasive material for a joint face segment seam along and diagonal to the direction of stress.

4. The process in accordance with claim 1 further comprising first depositing a flexible plastic band containing a mixture of plastic and hard substances and then depositing a top layer of a flexible band containing a mixture of plastic and brazing alloy.

5. The process in accordance with claim 4 wherein said hard substance is a carbide.

6. The process in accordance with claim 5 wherein said plastic is selected from the group consisting of: polytetrafluoro-ethylene, ethylene-propylene rubber, butyl rubber, and ethylene vinyl acetate polymers.

* * * * *